(12) United States Patent
Leister et al.

(10) Patent No.: US 10,146,180 B2
(45) Date of Patent: Dec. 4, 2018

(54) PROJECTION DISPLAY AND METHOD FOR DISPLAYING AT LEAST ONE OF TWO-DIMENSIONAL AND THREE-DIMENSIONAL SCENE OR OF CONTENT

(71) Applicant: SEEREAL TECHNOLOGIES S.A., Munsbach (LU)

(72) Inventors: Norbert Leister, Dresden (DE); Gerald Fuetterer, Dresden (DE); Bo Kroll, London (GB); Hagen Stolle, Radebeul (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 14/755,781

(22) Filed: Jun. 30, 2015

(65) Prior Publication Data
US 2016/0004219 A1 Jan. 7, 2016

(30) Foreign Application Priority Data

Jul. 4, 2014 (DE) .......................... 10 2014 109 411
Jul. 4, 2014 (DE) .......................... 10 2014 109 415

(51) Int. Cl.
*G03H 1/00* (2006.01)
*G03H 1/22* (2006.01)
(Continued)

(52) U.S. Cl.
CPC .............. *G03H 1/2294* (2013.01); *G02B 5/32* (2013.01); *G02B 26/0833* (2013.01);
(Continued)

(58) Field of Classification Search
CPC .. G03H 1/2294; G03H 1/2286; G03H 1/0005; G03H 2001/0224; G03H 1/08; G03H 1/0841; G03H 2225/60; G03H 1/0443; G03H 1/0866; G03H 1/32; G03H 2001/0212; G03H 2210/32; G03H 2210/33; G02B 5/32; G02B 26/0833; H04N 9/3126
(Continued)

(56) References Cited

U.S. PATENT DOCUMENTS

| | | |
|---|---|---|
| 7,551,341 B1 | 6/2009 | Ward et al. |
| 8,441,703 B2 | 5/2013 | Leister |
| 9,049,413 B2 * | 6/2015 | Richards .............. H04N 9/3126 |

* cited by examiner

*Primary Examiner* — Jade R Chwasz
(74) *Attorney, Agent, or Firm* — Saul Ewing Arnstein & Lehr LLP

(57) ABSTRACT

A projection device is provided for displaying at least one of a two-dimensional and three-dimensional scene or of content. The projection device comprises an illumination device, at least two spatial light modulator devices and an optical system. The illumination device comprises at least one light source for generating a holographic illumination. One of said spatial light modulator devices is designed as spatial light modulator device modulating at least the phase of the light for the holographical generation of illumination patterns. This spatial light modulator device as first spatial light modulator device is followed by a second spatial light modulator device. The optical system is disposed to illuminate the second spatial light modulator device with a predefinable light distribution generated by the first spatial light modulator device.

23 Claims, 8 Drawing Sheets

(51) Int. Cl.
| | |
|---|---|
| *G02B 5/32* | (2006.01) |
| *G02B 26/08* | (2006.01) |
| *G03H 1/08* | (2006.01) |
| *G03H 1/32* | (2006.01) |
| *H04N 9/31* | (2006.01) |
| *G03B 21/00* | (2006.01) |
| *H04N 13/04* | (2006.01) |

(52) U.S. Cl.
CPC ......... *G03B 21/008* (2013.01); *G03H 1/0005* (2013.01); *G03H 1/08* (2013.01); *G03H 1/2286* (2013.01); *G03H 1/32* (2013.01); *H04N 9/3126* (2013.01); *H04N 9/3161* (2013.01); *H04N 9/3164* (2013.01); *H04N 9/3197* (2013.01); *H04N 13/0459* (2013.01)

(58) Field of Classification Search
USPC ........................ 359/9, 10, 11, 21, 35, 30, 32
See application file for complete search history.

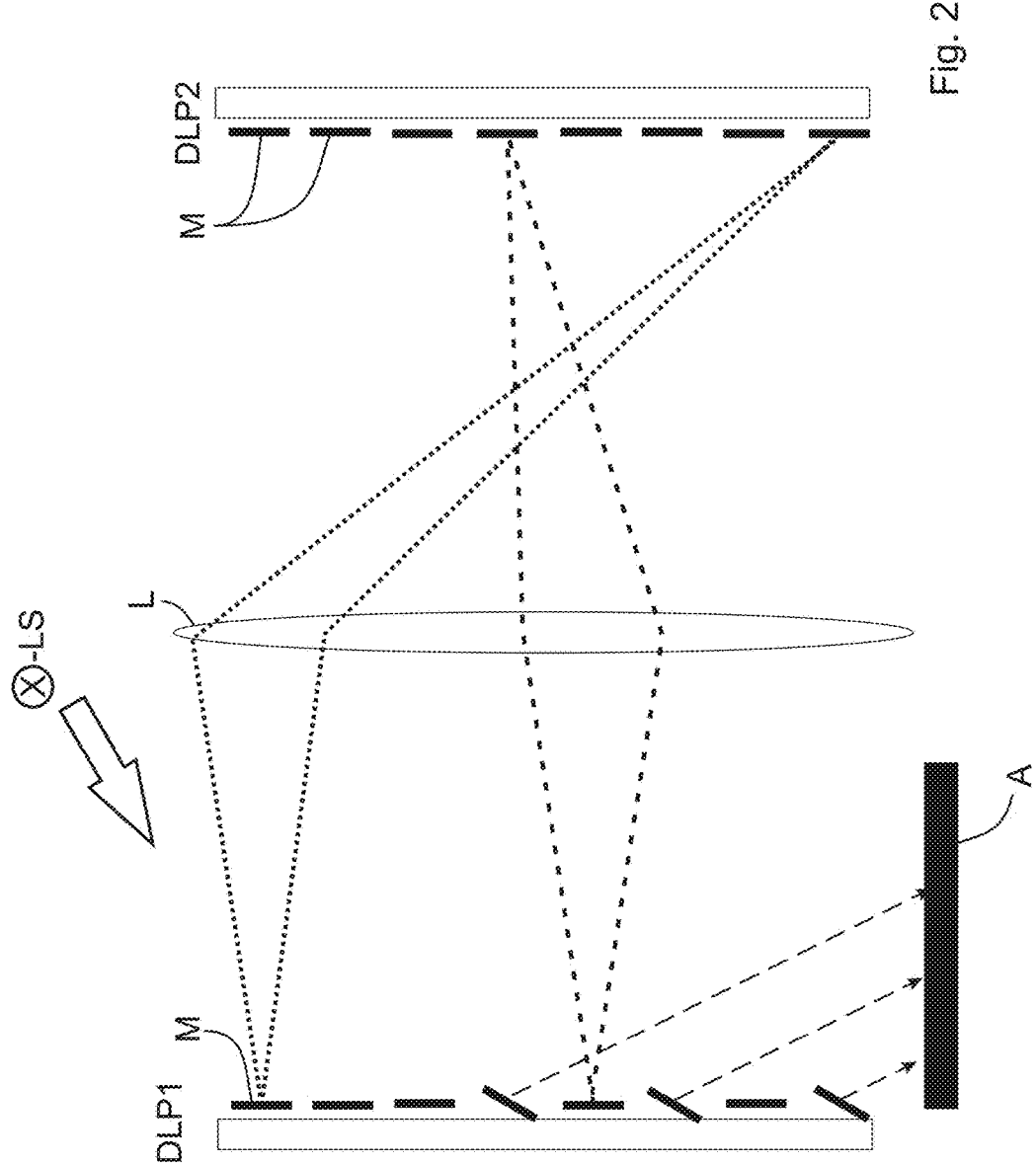

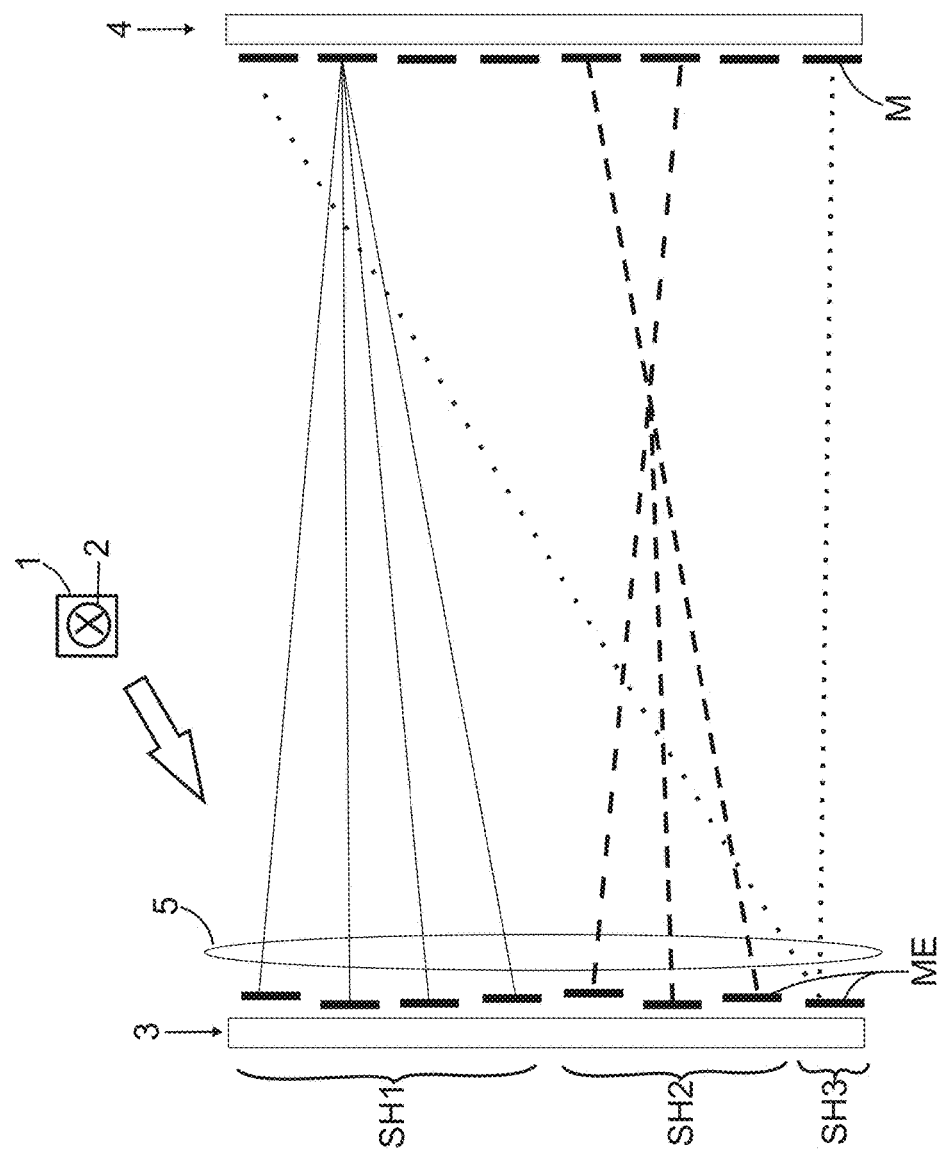

PROJECTION DISPLAY AND METHOD FOR DISPLAYING AT LEAST ONE OF TWO-DIMENSIONAL AND THREE-DIMENSIONAL SCENE OR OF CONTENT

CROSS-REFERENCE TO RELATED APPLICATIONS

This application is based on, and claims priority to German Application No. DE 10 2014 109 411.5, filed Jul. 4, 2014 and German Application No. DE 10 2014 109 415.8, filed Jul. 4, 2014, the entire contents of each of which being fully incorporated herein by reference.

BACKGROUND OF THE INVENTION

The present invention relates to a projection device for displaying at least one of a two-dimensional and/or three-dimensional scene or of content. The present invention relates in particular to a holographic reconstruction in a projection way. In particular the present invention relates to a projection display device using an optimized illumination for increased peak brightness and dynamic range. Such display devices are required mostly for projection applications like in cinemas, vehicle applications or similar applications. However, other applications are also possible.

Furthermore, the present invention relates also to a method for displaying at least one of a two-dimensional and/or three-dimensional scene or of content, in particular for generating a holographic reconstruction.

The present projection device is adapted for displaying two-dimensional (2D) and/or three-dimensional (3D) images. It shall be understood that two-dimensional images or three-dimensional images also include two-dimensional or three-dimensional contents or movies.

The field of application of the present invention includes preferably projection display devices for the three-dimensional presentation of holographic images.

In a commercially available projection display device for the presentation of two-dimensional images or movies/videos it is necessary to realize an increased brightness, high image quality and high contrast. The information to be presented is written into a spatial light modulator device of the projection display device. The light which is emitted by an illumination device comprising at least one light source is modulated with the information that is written into the spatial light modulator device, where the light modulated with the information is then projected by a projection system to a screen or similar. To achieve a high quality of the preferably three-dimensional presentation of the information written into the spatial light modulator device, a defined collimation of the wave fronts that are coupled out of the illumination device is necessary in addition to a homogeneous illumination of the entire surface of the spatial light modulator device. This is of high importance for holographic presentations in the form of a reconstruction that is to be generated. The holographic information, which can for example be an object that is composed of object points of a three-dimensional scene, is normally encoded in the form of amplitude values and phase values in the pixels as modulation elements of the spatial light modulator device. The encoded object points are generated by the wave field that is emitted by the spatial light modulator device.

A complex value which serves to modulate both the phase and the amplitude of a wave front cannot be displayed satisfactorily directly in a single pixel of a conventional spatial light modulator device. The modulation of only one value per pixel, i.e. a phase-only or an amplitude-only modulation, however only results in an insufficient holographic reconstruction of a preferably moving three-dimensional scene. A direct and thus optimal—in the sense of generalized parameters—representation of the complex values can only be achieved by a complex valued modulation preferably at the same plane and at the same time in the spatial light modulator device. Depending on the actual type of spatial light modulator device, various methods are known to achieve a simultaneous modulation of both parts of the complex values to be displayed.

In document U.S. Pat. No. 7,551,341 B1 a serial modulation display is disclosed comprising two spatial light modulators in the form of two DLP (digital light processing) which are arranged in series. These two DLP are combined by an optical transfer system. FIG. 1 shows this serial modulation display in detail. This projection display 10 comprises a light source 12, two DLP 14 and 20 and a projection lens 28 to project an image to a screen 29. Transfer optics 26 is provided to transfer light from the first DLP 14 to the second DLP 20. The transfer optics 26 also includes a blur function. The DLP 14 and 20 each comprises a plurality of controllable elements 16 and 22. These elements can be switched between ON or OFF states by a control circuit 18. When the element 16 is in its ON state, the element 16 allows incident light that hits the element to pass to a corresponding area of the second DLP 20. When the element 16 is in its OFF state, the light that passes from the element 16 to the second DLP 20 is diminished. Thus, no light from the element 16 reaches the second DLP 20. Each element 22 of the second DLP 20 can be controlled to select light that is incident on the element 22 from the first DLP 14 that is transmitted to a viewing area. The pattern of light incident on the second DLP 20 is determined from the configuration of the first DLP 14 and the transfer function of the transfer optics 26. This means which elements 16 are ON and which elements 16 are OFF.

Generally, a projection system like the serial modulation display of U.S. Pat. No. 7,551,341 B1 can comprise a light source device, two spatial light modulators, e.g. two DLP, and an optical system, e.g. a lens, arranged between the first and the second spatial light modulator. FIG. 2 shows a simplified schematic projection system having a light source device LS, two spatial light modulators DLP 1 and DLP 2 designed as DLPs and an absorber A. Because the two spatial light modulators DLP 1 and DLP 2 comprise reflective elements the real beam path is therefore different.

This projection system shown in FIG. 2 comprises thus the spatial light modulator DLP 1 as first spatial light modulator and the spatial light modulator DLP 2 as second spatial light modulator and uses a lens L between the first spatial light modulator DLP 1 and the second spatial light modulator DLP 2. Each pixel of the first spatial light modulator DLP 1 is imaged to a dedicated pixel of the second spatial light modulator DLP 2. Variations can exist where e.g. the first spatial light modulator and the second spatial light modulator do not necessarily have to comprise an identical number of pixels.

By setting a pixel of the first spatial light modulator DLP 1 to a black state (OFF state) by tilting a mirror element M of the first spatial light modulator DLP 1 accordingly in the direction of the absorber A to absorb this light incident on the absorber A, the illumination intensity of the dedicated pixel of the second spatial light modulator DLP 2 is zero, i.e. no light is incident on the dedicated pixel. By a binary sequence of ON and OFF states of the mirror element M of the first spatial light modulator DLP 1 also a grey level of illumination for the pixel of the second spatial light modulator DLP 2 can be generated. By making use of this fact and in addition by setting a suitable grey level on the second spatial light modulator DLP 2 the contrast of the content as shown on the projection system can then be increased compared to a single spatial light modulator system. But it should be noted that the maximum image (pixel) brightness cannot be larger than but only smaller than or equal to the brightness of the light source device LS which can be designed as laser light source.

For relative calculations, the incoming light intensity from the light source device LQ on the first spatial light modulator DLP 1 is set to 100%. In the special case that the content to be shown on the projection system or projection display is a white screen, then it is assumed that in the projection system, where all pixel of the first spatial light modulator is set to "ON-state", the illumination intensity of the second spatial light modulator DLP 2 is also still close to 100%.

For the sake of simplicity it is also assumed that the transmittance of the second spatial light modulator DLP 2 is 100% in case of a white screen.

There are however disadvantages relating to such a projection system.

One of it is the energy loss. For an image scene with mostly dark content, that means large relatively dark areas and only a few maximum brightness objects, the light source device has to deliver its maximum brightness. Accordingly, in the projection system shown in FIG. 2 a large part of the illumination light will be filtered out and get lost in between the first spatial light modulator and the second spatial light modulator. The illumination intensity of a single white pixel on the second spatial light modulator will never be larger than the maximum brightness of the expanded light source device which is given by the first spatial light modulator, independent of the content on the second spatial light modulator.

A second main disadvantage is given by the peak brightness. For any scene with at least one spot with maximum brightness, the maximum power of the light source device is required. For any scene, the brightness provided by the light source device can never be smaller than the maximum brightness in any portion of the scene. Also peak brightness of selected highlights in the scene can never be higher than maximum brightness of the expanded light source device given by the first spatial light modulator.

SUMMARY OF THE INVENTION

Therefore, it is an object of the present invention to provide a projection device which avoids the disadvantages of the prior art projection systems. Further, the projection device shall be designed to obtain an optimized illumination for increased peak brightness and increased dynamic range.

The object of the present invention is achieved by way of a projection system claimed in claim 1.

The projection device according to the invention is provided for displaying at least one of a two-dimensional and/or three-dimensional scene or of content. The projection device comprises an illumination device, at least two spatial light modulator devices and an optical system. The illumination device comprises at least one light source for generating a holographic illumination. One of said at least two spatial light modulator devices is designed as spatial light modulator device modulating at least the phase of the light for the holographical generation of illumination patterns by use of hologram data written into the spatial light modulator. Preferably, the spatial light modulator device is designed as only phase-modulating spatial light modulator device. Said spatial light modulator device designed as first spatial light modulator device is followed by a second spatial light modulator device. The optical system is disposed to illuminate the second spatial light modulator device with a predefinable light distribution generated by the first spatial light modulator device.

A projection device is proposed with holographic illumination. The inventive projection device has a basic construction as disclosed e.g. in U.S. Pat. No. 7,551,341 B1 and as shown in FIG. 2. In comparison with the projection system of FIG. 2, the second spatial light modulator device of the projection device according to the invention can be the same as disclosed according to FIG. 2. This means the second spatial light modulator device can be a DLP (digital light processing) or any other spatial light modulator as a DMD (digital micro-mirror device). However, DLP or DMD are preferred. The first spatial light modulator device however is replaced by a spatial light modulator device modulating at least the phase of the light for generation of holograms which in turn illuminate the second spatial light modulator device with a desired light distribution. This second spatial light modulator device can also be a (dedicated) DLP as mentioned above.

By this means, it is possible in an efficient way to redirect light not needed in dark regions of an image scene to bright pixels instead of filtering out this light and wasting this energy. This not only increases the energy efficiency or can reduce maximum brightness required by the illumination device for a given scene. But it also allows significantly higher brightness of selected regions of an image scene, higher than the maximum brightness of the expanded illumination device given by the first spatial light modulator device.

Encoding of a hologram on the first spatial light modulator device can then be used for redistributing the light for illumination of the second spatial light modulator device. Illumination of dark areas in a scene can be reduced with the advantage of redirecting this light to bright areas. Of course in case of showing a complete white screen as content which is extremely rare, there will only a small improvement by use of a hologram.

Otherwise, for content with bright objects in a mixed scene it is possible to focus light from the first spatial light modulator device to the bright objects instead of filtering out the light provided for dark areas in the scene as it is the case in the projection system according to U.S. Pat. No. 7,551, 341 B1. In this way intensity of the bright objects can be increased according to the invention.

Thus, the projection device according to the invention enables high contrast, high dynamic range imaging with significantly increased peak brightness.

Furthermore, this can ideally be enabled by currently available illumination devices or illumination devices in development without further increasing the peak brightness requirements for the illumination device and without higher power consumption. Preferably, the features of the projection device enable the use of similar or less energy than a comparable system such as described in the prior art. The projection device enables the increasing of the image brightness or the reduction of the required illumination intensity for certain image brightness levels.

In the following the term "spatial light modulator device" is characterized by the term "SLM".

Further preferred embodiments and improvements of the present invention are defined in the dependent claims.

In a first preferred embodiment of the invention, the optical system comprises at least one imaging element, preferably the optical system is provided close to or directly at the position of the first spatial light modulator device. The imaging element can be a lens or a lens array. Instead of using a lens arranged between the first SLM and the second SLM for imaging the first SLM onto the second SLM as disclosed in U.S. Pat. No. 7,551,341 B1, the optical system, e.g. a lens, is directly placed at the position of the first SLM. The focal length of the optical system should be approximately equal to the distance between the first SLM and the second SLM. In this way the Fourier plane of the first SLM is located or generated at or close to the second SLM.

In other words, the second SLM is provided in or close to the Fourier plane of the first SLM generated by the optical system.

Advantageously, the resolution or the pixel pitch of the first spatial light modulator device and the distance between the first spatial light modulator device and the second spatial light modulator device can be determined such that for all wavelengths of the illumination the dimension of one diffraction order of the first spatial light modulator device which is generated on the second spatial light modulator device does not fall below a value of the area of the second spatial light modulator device.

In order to generate the desired intensity pattern for illumination of the second SLM the dimension of one diffraction order, i.e. the distance to the next diffraction order, of the first SLM should be equal to or larger than the size of the second SLM. This is required for both horizontal dimension of diffraction order compared to horizontal size of the second SLM and vertical dimension of diffraction order compared to vertical size of the second SLM.

Otherwise, the illumination pattern would be repeated within the area of the second SLM. This means, an individual generation of desired illumination intensity for certain pixels or pixel groups of the second SLM is no longer possible, especially if a bright spot is repeated at different positions on the second SLM where a dark grey level is required. This causes problems with the contrast ratio.

This condition mentioned above has to be fulfilled for all wavelengths of illumination, including the blue wavelength which has the smallest dimension of its diffraction order. For example a 0.95 inch DLP as second SLM with an aspect ratio of 16:9 has a size of approximately 20.8 mm×11.7 mm. The dimension of a diffraction order is proportional to d×λ/p, where d is the distance, λ the wavelength of the used light of the illumination device and p the pixel pitch of the first SLM. For a rectangular pixel of the first SLM the horizontal pixel pitch has to be taken into account for the horizontal dimension of the diffraction order, the vertical pixel pitch has to be taken into account for the vertical dimension of the diffraction order.

For the exemplary first, at least the phase-modulating SLM with its relatively large pixel pitch of 40 μm and a blue wavelength of 475 nm this would lead to a required distance between the first SLM and the second SLM of 1.75 m. The optical path can be folded by use of reflective elements as mirrors, but this value is still quite large. In addition, the diffraction angle from the first SLM to the second SLM is then only 0.7° deg, stretching over the entire area of the second SLM.

Even a small angular spectrum of illumination (deviation from a plane wave) of the first SLM might already cause a significant blur of light over a large number of pixels on the second SLM. This limits the possibility of focusing light to a small spot.

The situation is much more relaxed in case of using at least the phase modulating SLM as first SLM with a smaller pitch, for example in the same range as the pitch of the DLP itself, e.g. 10.8 μm. In this case, the required distance between the first SLM and the second SLM reduces to approximately 50 cm. And the diffraction angle from the first SLM to the second SLM increases to approximately 2.5° deg. In this case, the same angular spectrum of illumination of the first SLM causes less blur on the second SLM.

In an alternative design it is possible to make the area of the diffraction order, i.e. the vertical dimension times horizontal dimension of the diffraction order, slightly larger than the area of the second SLM. In this case, light can also be sent to an area outside of the second SLM. This enables partial redistribution and partial filtering of light from the first SLM.

Preferably, a predefined value of the intensity in higher diffraction orders of the hologram encoded on the first spatial light modulator device is not exceeded compared with a defined value of the intensity of the diffraction order that is used for illuminating the second SLM.

Generally, a pixelated structure if illuminated with a coherent light source will always cause higher diffraction orders. Within a single diffraction order the light distribution can be modulated by the phase values written into the SLM pixels. The amount of light intensity in each diffraction order is depending on parameters like for example the fill factor of a single pixel and a potential variation of reflectance over the pixel area of the SLM. Even for a 100% fill factor of a single pixel the relative light intensity coming from this pixel, i.e. being transmitted or reflected by the pixel, and going to a single diffraction order is limited to maximum 60% and the other 40% of the light intensity coming from the pixel would be lost to other diffraction orders. This relative intensity value reduces to about 55% for a fill factor of a pixel being 90% and to about 50% for a fill factor of a pixel being 80%. A DLP as spatial light modulator device can have however pixels with a fill factor even above 90%. A MEMS (micro-electro-mechanical system) array as preferably phase-modulating SLM with regard to the fill factor of the pixels would be in a similar range as the DLP. This means a relative intensity value of at least 55% in the first diffraction order is very realistic.

For the sake of simplicity, in the following calculations a rounded relative light intensity value of 50% in the diffraction order that is used for illuminating the second SLM is assumed. This means that approximately the half of the input intensity emitted by the illumination device on the first SLM is lost and cannot be used for illumination of the second SLM.

This leads to the consequence that for the special content of showing a white screen on the second SLM the solution according to the invention with the holographic illumination of the second SLM would be darker by about a factor of 2× than for a conventional illumination of the second SLM. Therefore, in such a case where a completely write screen shall be provided on the second screen it is preferred to combine the holographic illumination of the second SLM with other types of illumination as for example conventional illumination applications as disclosed in U.S. Pat. No. 7,551,341 B1.

In FIG. 4b, this figure is described later on, a scene which is called here "Snow window" is shown. Taking into account the grey value of each pixel of this "Snow window" scene and considering that the brightness is proportional to the square of the grey value one can calculate the average brightness of this scene, e.g. by summing up intensity values of all pixel and then dividing by the number of pixels. The result for the "Snow window" is that the average brightness is about ⅓ compared to that of a white screen. If it would be possible according to the invention with the holographic illumination of the second SLM to redistribute 100% of the light coming from the first SLM to the "Snow window" scene then the bright parts of the "Snow window" could be made 3 times brighter compared to a white screen at conventional illumination of the second SLM.

Regarding the scene "Snow window" as example and taking into account 50% light loss to higher diffraction orders as described above would decrease the possible improvement according to the invention with the holographic illumination compared to a conventional illumination from a factor of 3× to about 1.5× in case of a same resolution of both SLM, the first and the second SLM.

That means either the same input illumination intensity as for conventional illumination can be used to generate a 1.5× brighter scene or the input illumination intensity can be reduced in order to get the same scene brightness but to save energy.

This factor 1.5× means that only ⅔ of input illumination intensity would be required compared to a conventional illumination in order to get a scene with the same brightness. Advantageously, the seemingly limited energy increase can still be used to generate very bright highlights in the scene "Snow window" with a factor of >300×. This can be done by keeping the illumination intensity level the same as for conventional illumination, using ⅔ of this intensity for generating the original scene and using the remaining ⅓ of illumination light intensity to focus this light on a few small very bright spots to be added to the scene.

For the reconstruction of the hologram encoded on the first spatial light modulator device it is important that the at least one light source of the illumination device comprises a sufficiently large coherence.

Further, the at least one light source of the illumination device comprises a sufficiently small coherence for reduction of speckle.

In a further embodiment of the present invention, it can be provided that a diffuser device is provided for reduction of speckle in the light distribution of the illumination on the second spatial light modulator device.

In general, in all probability any kind of blur will impact on the brightness gain. Blur can be generated by mismatch of the SLM resolution for the illumination and the content. Blur coming from diffusors applying for de-speckle or blur coming from poor illumination quality can be combined to a total value which then determines the overall brightness gain.

A holographic illumination of the second SLM by using at least one of sufficiently coherent light source for example designed as laser light source will generate a speckle pattern on the second SLM. Speckle will need to be largely reduced for example by smoothing the resulting intensity pattern of the illumination on the second SLM. This can be done by use of a diffuser device, e.g. a weak diffuser.

Current projection systems with two DLP as spatial light modulators also use laser illumination and already include methods for speckle reduction, e.g. reduced coherence of the laser beam emitted by the light source. This practice or similar methods can also be used in a projection device with holographic illumination according to the invention. This includes for example a moving diffusor at the position of the second SLM in case of displaying two-dimensional (2D) images.

The simulations as shown in FIGS. 4a, b, c; 5, 6, 7, 8, 9a, b, c and 10a, b, c done for showing the present invention do however not use any of such methods. So indications of speckle effects shown in the figures of this document can be greatly improved by these and other methods of de-speckle, e.g. also by proprietary coding methods as disclosed in U.S. Pat. No. 8,441,703 B2.

It can also be possible that a correction intensity factor is provided for compensating for blur or for smoothing of the illumination intensity from the hologram.

For cases where the holographic illumination of the second SLM might even lead to a decrease of brightness compared with a conventional projection system and the brightness might then only be around 70% due to the fact that about half of the input light incident onto the second SLM is lost to higher diffraction orders, it can be preferred that the projection device comprises a further spatial light modulator device, where said further spatial light modulator device is arranged in parallel to the first spatial light modulator device for illumination the second spatial light modulator device.

With the providing of a further spatial light modulator device, in the following denoted by the term "third spatial light modulator device", it is possible to create a hybrid system using a conventional projection system in combination with the projection device according to the invention. This means, the projection device designed as hybrid system uses in parallel both a third SLM designed preferably as DLP or DMD for illumination as in a conventional projection system, and the SLM modulating at least the phase for holographic illumination of the second SLM. Depending on the actual content which is to be displayed for example on a screen switching might be done between both systems or devices, i.e. between the conventional projection system and the projection device for holographic illumination. In this manner the correct projection system/device can be chosen which is more efficient for a certain type of content to be displayed.

For scenes to be displayed with large areas of the same brightness the DLP as example for the third SLM is used for illumination of the second SLM. For scenes to be displayed with small, very bright objects or areas, the first SLM is used for a holographic illumination of the second SLM.

Thus, the projection device can be designed as hybrid system and can comprise a switch device for switching from the at least the phase of the light modulating spatial light modulator device as first spatial light modulator device to the further spatial light modulator device as third spatial light modulator device and vice versa for the selection of the more efficient way of illumination of the second spatial light modulator device, depending on the actual content to be displayed on the second spatial light modulator device.

Preferably, the same at least one light source can be used for the holographical generation of illumination patterns with the first spatial light modulator device and for illumination with the further spatial light modulator device.

Alternatively, the illumination device can comprises at least two light sources, where at least one of the at least two light sources is used for the holographical generation of illumination patterns with the first spatial light modulator device whereas at least one other light source of the at least two light sources is used for illumination with the further spatial light modulator device.

At least one of the at least two light sources can comprises a sufficiently large coherence for reconstruction of the hologram encoded on the first spatial light modulator device whereas at least one other of the at least two light sources is an incoherent light source for incoherent illumination with the further spatial light modulator.

In an advanced version of such a projection device designed as hybrid system it can be provided that a switch device is provided which is designed as a variable switch device for switching from the illumination device to both the first spatial light modulator device and the further spatial light modulator device for sending (directing) a predefined quantity of light emitted by the illumination device to the first spatial light modulator device and a predefined quantity of light to the further spatial light modulator device, depending on the actual content to be displayed on the second spatial light modulator device.

The projection device according to the invention might have a variable switch device for switching from the at least one light source of the illumination device to both type of illumination SLM, i.e. to the first SLM and to the third SLM, like a variable beam splitter or a beam steering element to send for example 80% of the input light emitted by the illumination device to the DLP illumination and 20% to the holographic illumination, depending on content of the scene to be displayed. This 20% of the holographic illumination might then be concentrated to a few small bright spots or areas or objects in order to increase the intensity of such spots/areas/objects.

The following deals with types of preferably phase-modulating SLM which can be used according to the invention and with the effect of the resolution of the phase-modulating SLM on the illumination pattern incident on the second SLM.

At the present time, DLP as spatial light modulator for the second SLM are available at HD (high definition) resolution (e.g. 1920×1080 pixels) or even larger resolution. For a hologram generation in principle the resolution of the phase-modulating SLM restricts also the resolution for which an illumination pattern can be generated on the second SLM.

But there are options as explained in the following. In case of using the same resolution of both SLM, i.e. for the first SLM and the second SLM, in principle for each pixel of the second SLM an individual value of illumination intensity can be generated. On the other hand, it is also possible to use a phase-modulating SLM as the first SLM with lower resolution. For example, if using a resolution of the first, phase-modulating SLM of 960×540 pixels then for each group of 2×2 pixels on the second SLM common illumination intensity is generated.

In practical cases effects as the quality of an optical unit which can be used for beam expansion for illumination of the first SLM and the application of methods for speckle reduction, for example by adding some kind of diffuser, may also have effect on the spatial resolution of the illumination pattern on the second SLM as generated by the holographic illumination using the first SLM.

Preferentially, a phase-modulating SLM with a phase modulation range of larger than or equal to $2\pi$ for all 3 primary colors, i.e. for red, green and blue, is used as first SLM. On the other hand, the present invention is not restricted to this case: If the phase modulation range is smaller than $2\pi$ for one or more colors, then the quality of the illumination pattern, that means for example the contrast between bright spots and dark areas in the illumination pattern, will be reduced, but generally the set-up still works. A binary SLM will also be disadvantageous in terms of contrast of the illumination pattern. Preferentially, a bit depth of at least 6 bit (64 phase levels) for the first SLM is expected to be suitable, but the invention is not limited to this case.

Phase modulating LCoS (liquid crystal on silicon) systems with HD (high definition) resolution and a small pixel pitch of e.g. around 8 μm or even smaller are available on the market at present. In a projection device such a phase-modulating LCoS might be used but for high brightness applications it might cause problems with heat generation from the light absorption inside the LCoS due to large laser illumination intensity.

The preferred type of phase-modulating SLM to be used in a device according to the invention is a MEMS (micro electro mechanical system) mirror type SLM as first SLM. Instead of tilting type mirror elements that are used in a DLP, for phase modulation tip mirror elements are more suitable. A state of the art prototype of such a tip mirror MEMS type SLM with analogue phase modulation of the incident light has a relatively low resolution and large pixel size, i.e. 240×200 Pixel with 40 μm pitch and a phase stroke of 500 nm. A phase stroke of 500 nm means full $2\pi$ phase modulation for blue light and almost or nearly $2\pi$ for green light but significantly less than $2\pi$ for red light. This is only an example to show that such a MEMS type SLM does exist and will work according to the invention. However, MEMS type SLMs with other resolution and other pixel size as mentioned above are possible or even more efficient since the prototype above is only a first approach and has to be developed further.

Another possibility of a phase-modulating SLM is a one-dimensional (1d) high resolution array as e.g. GLV (grating light valve) available as a product but also the development of two-dimensional (2d) arrays similar to the GLV type has been reported from the same US company that developed 1d GLV. The use of a one-dimensional array in combination with a fast scanner might also be an option for generating of a two-dimensional illumination pattern but has some limitations compared to a two-dimensional array of phase pixels.

The object of the invention is also achieved by a method according to claim 20.

The method according to the invention is provided for displaying at least one of a two-dimensional and/or three-dimensional scene or of content, the method comprising:
generating a holographic illumination by an illumination device comprising at least one light source,
predefining a light distribution depending on the brightness distribution of a scene to be displayed,
holographically generating said predefinable light distribution by means of calculating a hologram and encoding said hologram into a first spatial light modulator device designed as spatial light modulator device modulating at least the phase the light and arranging a second spatial light modulator device which follows the first spatial light modulator device, seen in the propagation of light,
illuminating the second spatial light modulator device with said predefinable light distribution according to the hologram generated by the first spatial light modulator device by an optical system, and
modulating a light field having the predefinable light distribution incident on the second spatial light modulator device by said second spatial light modulator device in such a way as displaying the reconstruction of that scene.

In a preferred embodiment of the invention it can be provided that the predefinable light distribution for illumination of the second spatial light modulator device is adapted within the area of the second spatial light modulator device, depending on the content to be displayed on the second spatial light modulator device.

It can be advantageously provided that the illumination light of dark areas in a scene on the second spatial light modulator device is reduced to redirect this illumination light to bright areas in said scene.

Preferably, sub-holograms of the hologram can be generated on the first spatial light modulator device to generate a predefined light distribution on the second spatial light modulator device.

In this manner it is possible that the sub-holograms can focus light from the first spatial light modulator device to regions on the second spatial light modulator device or that the sub-holograms can have each a focus in a plane different from the plane of the second spatial light modulator device to illuminate simultaneously several pixels of the second spatial light modulator device.

BRIEF DESCRIPTION OF THE DRAWINGS

The invention will now be described in more detail below with the help of embodiments and in conjunction with the accompanying schematic drawings. Generally preferred configurations and developments of the teaching are also explained in conjunction with the explanation of the preferred exemplary embodiments of the invention with reference to the drawing. In the drawing, the figures are mostly front views unless otherwise specified, where the drawing is in each case in a schematic illustration:

FIG. 2 shows a simplified schematic illustration of a projection system with two spatial light modulators according to the prior art in a side view, FIG. 3 shows a simplified schematic illustration of a projection device according to the invention in a side view, FIG. 4a, b, c show three images with different content for showing the maximum possible brightness improvement.

DETAILED DESCRIPTION OF THE INVENTION

Figure 1:
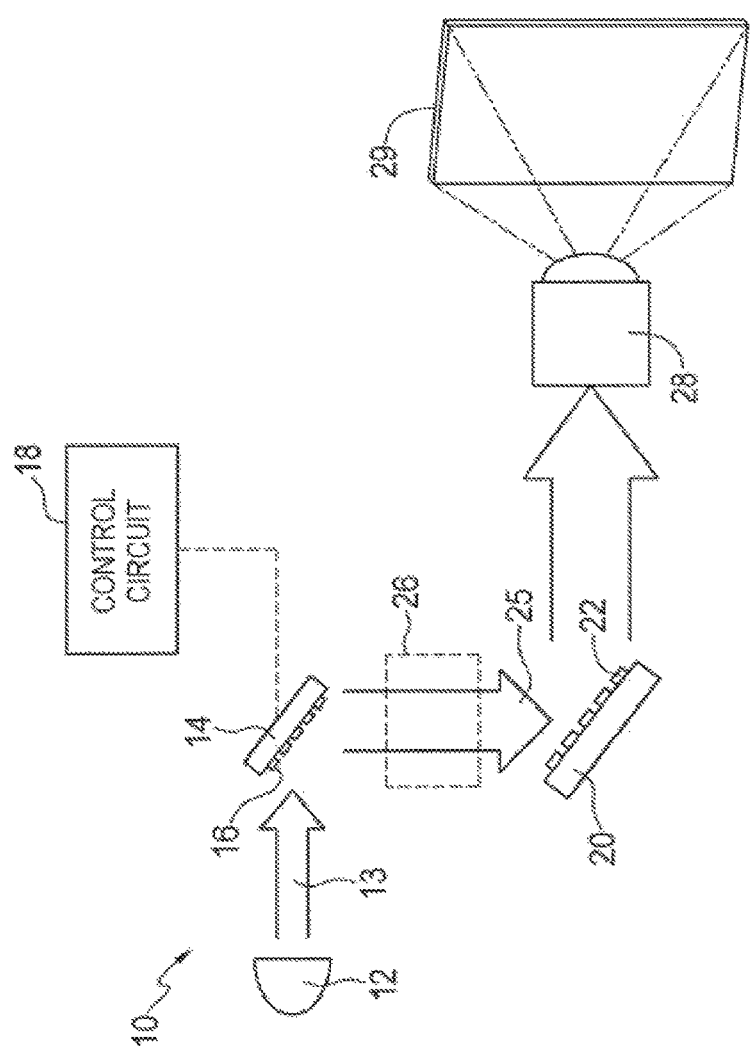
FIG. 1 shows a projection system according to the prior art.

Like reference designations denote like components in the individual figures and accompanying description. In the following, the designation "behind" e.g. behind the spatial light modulator device means the light seen in regards to the propagation of the light.

The projection device can contain several specific modifications to be used preferably within a holographic projection device. The projection device is preferably used with coherent light and with light which only shows reduced spatial and/or temporal coherence. The specifications are dependent on the discrete embodiment. Well-known elements, as e.g. the light source, have not been shown or described in detail in order to not distract from the invention. Accordingly, the drawings are to be regarded in an illustrative sense and not to restrict the invention.

An optical setup of a projection device according to a first embodiment of the invention is described below. FIG. 3 shows a projection device in a simplified schematic illustration which can be used preferably as holographic projection device in cinemas, theatres, for vehicles, high dynamic range imaging systems or in similar applications. The projection device comprises an illumination device 1 comprising at least one light source 2, a first SLM 3, a second SLM 4 and an optical system. The at least one light source 2 can be a laser light source, a LED (light emitting diode) light source or an OLED (organic LED) light source or any other light source which can emit light with sufficiently coherence.

Important differences between the projection device according to the invention and devices described in prior art can be seen by comparing FIG. 2 and FIG. 3.

The first SLM 3 is designed as a SLM modulating at least the phase of the light, preferably a phase-modulating SLM. Preferred is a MEMS type SLM. Such a MEMS type SLM is shown in FIG. 3. The MEMS type SLM 3 comprises controllable tip mirror elements ME which can be tipped according to a predefined requested phase modulation of the incident light emitted by the illumination device 1. The light coming from the illumination device 1 is shown here by an arrow. Another possibility for a first, phase-modulating SLM 3 can be a one-dimensional high resolution array as GLV.

The first SLM 3 provides an analogue phase modulation. The first SLM 3 is further in a preferred embodiment designed such that a phase modulation of $2\pi$ can be achieved especially for all three primary colors, i.e. for red, green and blue light. The first, phase-modulating SLM 3 is provided for generation of a hologram which in turn illuminate the second SLM 4 with a requested light distribution according to an image to be displayed e.g. on a screen or wall. In other word, the first SLM 3 generates in combination with an optical system an illumination pattern on the second SLM 4. The second SLM 4 can be a conventional SLM as proposed in conventional projection systems. Therefore, the second SLM 4 is in this embodiment designed as a DLP having controllable mirror elements.

The optical system is disposed between the first SLM 3 and the second SLM 4 and can comprise at least one imaging element 5. As imaging element 5 a lens or a lens array can be provided. For example, the optical system can act as a field lens generating an image of the light source 2 in the plane of the second SLM 4. The plane of the second SLM 4 would then be equivalent to a Fourier plane of the first SLM 3. So, both the first SLM 3 as well as the optical system differs from the ones shown in FIG. 2. According to the prior art. At the position of the first SLM 3 the optical system is directly placed as can be seen in FIG. 3. As already mentioned the second SLM 4 is arranged behind the first SLM 3 seen in the propagation of the light. As can be further seen in FIG. 3 the second SLM 4 is provided in or close to the Fourier plane of the first SLM 3, where the Fourier plane is generated by the optical system in combination with the hologram generated by the first SLM 3. Thus, for illumination of the first SLM 3 by a plane wave from the light source 2 the focal plane of the optical system is provided in the plane or at the position of the second SLM 4. That is the focal length of the optical system should be approximately equal to the distance between the first SLM 3 and the second SLM 4. More generally speaking the light source 2 should be imaged to or close to the plane of the second SLM 4 by the optical system and the imaging element 5 respectively.

The generation of a hologram and the encoding of this hologram on the first SLM are used for redistributing the light for the illumination of the second SLM. The Illumination of dark areas in a scene displayed on the second SLM 4 can be reduced in a controllable manner so that sufficiently required light intensity is provided for these dark or less dark areas on the second SLM 4. This advantage is the possibility to redirect light from the dark areas to bright areas on the second SLM 4. In other words, for more efficient use of the light or of the light energy it is now possible by the hologram on the first SLM 3 to redirect the light not required in dark areas of an image scene on the second SLM 4 to a bright area or to the bright pixels on the second SLM 4. Thus, what is avoided is that the not required light is filtered out e.g. to an absorber and get lost so that this light energy is wasted. This method allows a significantly higher brightness of selected regions or areas of an image scene on the second SLM 4, higher than the maximum brightness of the illumination device 1, in which or after it the light beam can be expanded by an optical unit.

For content in a mixed scene, i.e. bright areas mixed with dark areas, on the second SLM 4 with bright objects or bright areas, it is provided to focus the light from the first SLM 3 to the bright objects or bright areas on the second SLM 4 instead of filtering this light out. In this way the intensity of the bright objects or bright areas can be increased essentially.

As shown in FIG. 3, on the first, phase-modulating SLM 3 a plurality of sub-holograms, where only the sub-holograms SH1, SH2, SH3 are shown, are encoded which form the entire hologram. Generally, the sub-holograms are lenses in the form of phase-functions which generate a certain light distribution, in this embodiment on the second SLM 4. A certain required light distribution for the second SLM 4 can be done for example by focusing light from several pixels or mirror elements ME representing the pixel of the first SLM 3 to very small areas of the second SLM 4. This procedure is shown by the sub-hologram SH1 and by the solid lines.

An alternative procedure can be that the light is focused from several pixels or mirror element ME of the first SLM 3 to the second SLM 4 where the light beams of this light have a focus in a different plane as the plane or position of the second SLM 4 to illuminate several pixels or mirror elements M of the second SLM 4. This procedure is shown by the sub-hologram SH2 and the dashed lines in FIG. 3.

A further shown alternative could be that light coming from one pixel or mirror element ME of the first SLM 3 is spread to all pixel or mirror elements M of the second SLM 4 as shown by the sub-hologram SH3 and the dotted lines.

For all procedures discussed above holds that in practical cases the first, phase-modulating SLM 3, if it is a reflective SLM on the basis of a MEMS type SLM will be illuminated either at oblique angle or by use of a beam-splitter cube or similar elements. For example, a polarizing beam splitter cube might be combined with a quarter wave plate placed in front of the reflective SLM such that the outgoing light passes the beam splitter cube in a direction different from the incoming light. In general, other set-ups known for reflective SLM devices can also be used and the invention is not limited to a special configuration of illuminating a reflective SLM.

In the following the type of hologram is discussed which can be used for encoding on the first SLM 3.

An ideal hologram in order to exactly generate a desired and required intensity distribution on the second SLM 4 would need to be complex valued. That means it would include amplitude values and phase values. In principle, this can be generated by a combination of one amplitude-modulating SLM and one phase-modulating SLM or with other suitable arrangements in order to combine several pixels of an SLM in order to represent a complex value. Such a combination or suitable complex valued single SLM design would further increase the contrast of the first SLM 3. The invention is therefore not limited to a phase-modulating SLM but more generally to a hologram reconstructing SLM. On the other hand, a phase-modulating SLM is the preferred embodiment as in practical cases it is sufficient to generate the predefinable light distribution. Therefore and for the sake of simplicity values mentioned in the following only assume a single phase-modulating SLM.

Accordingly, as already discussed phase holograms are encoded on the first, phase-modulating SLM 3 in the present invention. The distribution of the illumination intensity from the phase hologram encoded on the first SLM 3 is then an approximation to the predefinable target intensity distribution on the second SLM 4.

In the simplest case the predefinable target intensity distribution is equal to the intensity distribution of a two-dimensional scene to be displayed.

This approximation to the predefinable target intensity distribution can be further improved by using an optimized hologram calculation. The grey level setting on the second SLM 4 will then be adapted to the illumination intensity from the first SLM 3 by considering of e.g. blur. Blur means that a part of the light intensity intended to illuminate one pixel of the second SLM 4 actually illuminates the neighboring pixels. If these pixels differ in the brightness to be displayed then a correction by either increasing or decreasing the amplitude modulation level on the second SLM 4 for these pixels is required. As already mentioned, the fact that the desired and required intensity distribution can only be approximated in practice will somewhat reduce the brightness gain achieved by the holographic illumination of the second SLM 4.

A key feature of a holographic illumination of the second SLM 4 according to the invention is its capability to redistribute light. It will not increase the absolute integrated luminance coming from the light source 2 of the illumination device 1. So, the possible increase of the peak brightness depends on the desired and required brightness distribution of the pixels or mirror elements M in a given content image on the second SLM 4. For small white objects or areas in a dark surrounding on the second SLM 4 the expected increase of brightness can be very large but in scenes or images with many objects or areas of similar brightness the increase may be lower. So, of importance is here the ratio between the desired and required maximum brightness level and the average brightness level of a content scene on the second SLM 4.

Figure 4A:
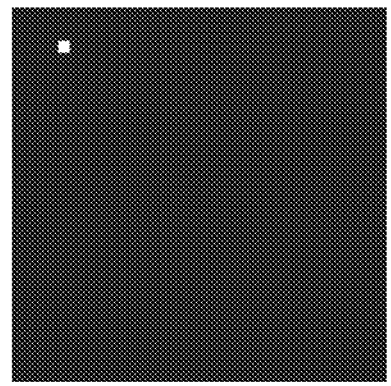

For exemplary calculations, some grey level image as shown in FIGS. 4*a*, *b* and *c* were used. In an approximation the target transmittance is assumed to be proportional to the square of the grey level of a pixel in the image (bitmap) (gamma of 2). In addition, for the sake of simplicity calculations were done only for monochrome content. As a matter of course, in practical cases separate illumination holograms are calculated for each color, i.e. for red, green and blue. These could be shown and encoded sequentially on the first, phase-modulating SLM 3. As another option the projection device may include separate units with two SLM for each color to generate red, green and blue images in parallel. SLM with color filters could in principle also be used but are not very common for projection type devices.

For the exemplary calculations, the average intensity is the sum of squares of all grey levels of the pixels of an image displayed on the second SLM 4, which is set into relation to the sum of squares of grey levels of a white image.

If considering individual colors then for example the average intensity for red is the sum of squares of all red levels of the pixels of an image displayed on the second SLM 4, which is set into relation to the sum of squares of red levels of a totally red image. This in general leads to different average intensities for red, green and blue. Then, the relative intensities of the light sources need to be adapted in order to display the correct color.

The following description is related to grey levels only. As examples for this the following images were chosen:

In the first image according to FIG. 4*a* a "Bright dot" spread across a few pixels of the second SLM 4 is placed on completely dark background. This leads to brightness gains based on holographic illumination of the second SLM 4. In this case the theoretical upper brightness limit when using a holographic illumination for the second SLM 4 would be a brightness increase by a factor of almost 1000×. In an extreme case of showing a single white pixel in a HDTV scene with all other pixels being completely black then the theoretical brightness gain might be even a factor of $2 \times 10^6 \times$. Instead of only increasing peak brightness a combination with energy saving in the light source is possible.

Of course such type of content is not common in a typical movie scene but it conveys the principle quite well. Also especially in the latter case of the single white pixel there would be a reduction of this theoretical level to a lower value as explained above.

Figure 4B:
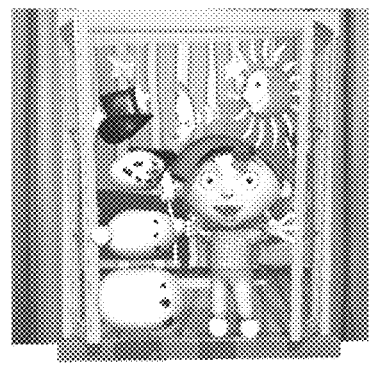

In a more practical case, regarding an image "Snow window" according to FIG. 4*b* the sum of squares of grey levels was calculated to be about one third compared to that of a totally white image.

But the consideration of possible gains includes several options. Principally there are three key options:
1. Increasing the total brightness of the scene on the second SLM, evenly redistributing of the light in such a way that all areas of the second SLM have a higher brightness corresponding to their grey value
2. Generating of small highlights in the scene on the second SLM with significantly more brightness
3. Keeping the same brightness over all areas of the second SLM as would be the case in conventional projection systems but use less energy in the light source of the illumination device.

For the "Snow window" image in regards to the above options, for instance it can be stated that the theoretical upper limit for increasing the brightness of brighter grey values but still keeping the same relative brightness of darker parts or areas of this image by a redistribution of illumination instead of filtering out and wasting of illumination light would be about a factor of 3×. Practical limitations may reduce this value (factor). The calculation of the brightness increase provides an indication of the increase using a holographic illumination on the second SLM. This holographic illumination can be combined with other options for example a hybrid system as combination of holographic and conventional illumination as described further below.

Since two thirds of the illumination intensity as compared to a conventional illumination system are not required for images as the "Snow window" shown in FIG. 4*b* then according to option 2. of above these ⅔ could be used to modify this image by adding some highlights, e.g. by combination with the image "Bright dot" of FIG. 4*a*. In this case the remaining energy can be focused into the dot with a brightness increase of factor ⅔×1000=600× as a theoretical maximum, while apart from this small bright added area still keeping the same brightness for the rest of the original "Snow window" image.

In the other example using the image named "Airplane" on a black background the theoretical upper limit of brightness improvement would be about a factor of 17× of the total scene to be displayed on the second SLM 4 according to option 1 or according to option 2 keeping the brightness of the airplane and add much more or much brighter selected additional spots.

In the following there are some practical considerations about the maximum possible brightness improvement.

The values of the brightness improvement in the theoretical examples above were calculated under the assumption that the first, phase-modulating SLM has the same resolution as the second SLM and that the sufficiently coherent illumination of the first SLM is with an ideal plane wave such that in principle for each pixel or mirror element of the second SLM a separate value of illumination intensity can be obtained from the hologram encoded on the first SLM.

In case of degrading the resolution of the first, phase-modulating SLM to a lower resolution than the resolution of the second SLM but still keeping the assumption of illumination with an ideal plane wave then for a group of several pixels or mirror elements of the second SLM a common illumination intensity value would result. The target light intensity for this group of pixels of the second SLM to be generated by the illumination hologram which is encoded on the first SLM can be adapted to the square of the maximum grey level of the image to be displayed on the second SLM within this group of pixels or mirror elements of the second SLM. For the other pixels or mirror elements within the group, for which the image to be displayed has lower grey level value than for the pixel with the maximum value, light would be filtered out by amplitude modulation on the second SLM by setting corresponding pixel transmittance of these pixels of the second SLM.

In a simplified numerical example, the second SLM has four pixels and the first SLM two pixels.

So, the first SLM generates a light intensity distribution with two intensity values on the second SLM. With each of these intensity values a group of two pixels on the second SLM is illuminated. The content to be displayed on the second SLM is an image with four pixels having grey levels of pixel 1: 255, pixel 2: 230, pixel 3: 190, and pixel 4: 150.

The intensity of these four pixels relative to a white image with all four pixels having a grey value of 255 is pixel 1: 1, pixel 2: 0.886 which has been calculated by 240*240/(255*255), pixel 3: 0.555, and pixel 4: 0.346.

For the target illumination intensity the maximum of each group would be used.

Group pixel 1+2: brightness 1, group pixel 3+4: brightness 0.555.

If these intensity values are generated by the first SLM then in order to show the correct content of the second SLM the pixels of this SLM need to modulate the light as follows:

Group 1: pixel 1 has the correct brightness (maximum grey value 255), pixel 2 input intensity 1, output intensity 0.886 which means grey value 230

Group 2: pixel 3: input intensity 0.555 from illumination, required output 0.55 that means amplitude modulation of this pixel set to full brightness, grey value 255 pixel 4: input intensity 0.555 from illumination, output 0.346 that means grey value 201 (because 0.346/0.555=0.623=201*201/(255*255)).

For comparison in a set-up where the first SLM has also four pixel and could generate an individual input intensity for each of the four pixel of the second SLM then all four pixel of the second SLM could be set to a maximum amplitude grey level of 255. Then the transmittance of the second SLM would be larger.

Accordingly, a reduced resolution of the first, phase-modulating SLM compared to the second SLM leads to a decrease of the maximum brightness increase by light redistribution compared to the case where both SLM the first SLM and the second SLM have the same resolution.

For the example of the image "Snow Window" in which the resolution of the first, phase-modulating SLM is reduced by a factor of 4 in each the horizontal dimension as well as the vertical dimension would reduce the output brightness increase output from the second SLM to a relative value of 83% compared to the first, phase-modulating SLM with full resolution, that means from a factor of 3× to about 2.5×.

In the example of the image "Snow window" typically neighboring pixels or mirror elements of the second SLM still have similar brightness values. The loss of brightness by using a phase-modulating SLM with lower resolution will be larger for extreme content of a scene, e.g. for the case of a single bright pixel on dark background. In this extreme case the brightness for the phase-modulating SLM e.g. with ¼ reduced resolution will be a brightness value of about 6.25% compared to full resolution, i.e. a resolution of $2\times10^6$. The brightness value of that single bright pixel would be approximately 125,000× brighter than an expanded light source of a conventional standard projection system.

In general, it is to be considered that anything that causes some kind of blur on the second SLM, as e.g. the angular spectrum of the sufficiently coherent illumination or the use of a diffuser device for speckle reduction, will have similar effects on the brightness increase as a smaller pixel resolution of the phase-modulating SLM will do. Thus, for a final system configuration of the projection device according to the invention an optimized combination of factors should be used. For example, diffusing elements in the set-up should be avoided, the angular spectrum of the illumination should be limited and such methods for speckle reduction that have the side effect to decrease spatial resolution should be limited to the range necessary for getting good image quality.

The following explanations relate to speckle reduction of the light distribution or of the image content on the second SLM.

In order to provide a first indication on how the holographic illumination of the second SLM by a phase-modulating hologram could look like some initial basic simulations were done. These simulations started with the requirement that the first SLM and the second SLM have the same resolution and the same pixel size and for simplification also a quadratic image shape. For comparison in a subsequent simulation the resolution of the first, phase-modulating SLM was then reduced. These initial simulations were also limited to a monochrome case, i.e. only to one illumination wavelength. The dimension of one diffraction order generated in the plane of the second SLM by the hologram on the first SLM and the optical system is in this case exactly equal to the area or dimension of the second SLM. As already mentioned, this can be refined or altered by using a slightly different area. In this first step for reducing speckle only a simplified hologram calculation was used.

For explaining the procedure the content or the image with the "Snow window" according to FIG. 4b is used. Based on this target content or target image a phase hologram on the first, phase-modulating SLM is calculated and from this the light distribution generated by the first SLM on the second SLM is simulated.

In the FIGS. 5 to 8 results of the simulations are shown. It should however be noted that the images shown in the FIGS. 5 to 8 show only relative brightness and are not a direct measure for improvement of brightness by the holographic illumination according to the invention. Especially in the images with a visible speckle pattern, as e.g. FIG. 6, the white shown parts of the speckle pattern in reality have larger brightness than might be indicated by these images.

Figure 5:
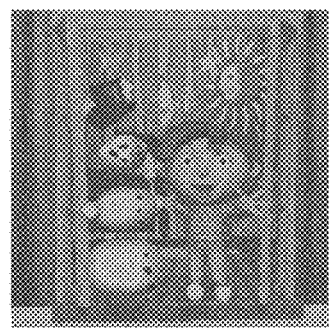
FIG. 5 shows an image with the content of FIG. 4b, where the resolution of both spatial light modulator devices are the same.

FIG. 5 shows the light distribution of the illumination on the second SLM. There, the result of the simulation is shown in the case of the same resolution of the first SLM and the second SLM. For this simulation a diffuser device in the projection device is not used. Further, the first SLM was illuminated with a plane illumination emitted by the illumination device. This simulation is a relative simulation and has in reality a larger brightness.

The light distribution shown in FIG. 5 is quite similar to the target content (image) values as shown in FIG. 4b but also still includes speckle. Speckle is a result of the interference of many waves of the same frequency, having different phases and amplitudes, which add together to give a resultant wave whose amplitude, and therefore intensity, varies randomly. Speckle may be avoided by adding to the projection device a diffuser device as some kind of weak diffuser.

Figure 6:
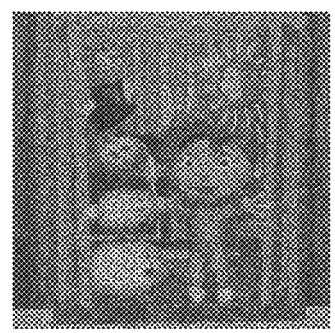
FIG. 6 shows the image of FIG. 5, where the resolution of the phase-modulating spatial light modulator device is smaller as the resolution of the second spatial light modulator device.

FIG. 6 shows now the result of the simulation in the case of using a smaller resolution of the first, phase-modulating SLM compared to the resolution of the second SLM. Here a resolution of a factor of 4 smaller is used in the horizontal direction as well as in the vertical direction. It should also be mentioned here that this simulation is a relative simulation and has in reality a larger brightness.

As can be seen in FIG. 6 the speckle pattern is now coarser compared to the speckle pattern shown in FIG. 5. This means the size of the speckle pattern is dependent on the resolution of the first, phase-modulating SLM. Therefore, also the parameters (at least some of the parameters), as spectral width of the sufficiently coherent light source, diffuser angle, coding de-speckle etc., for de-speckle methods will be dependent on this resolution of the first, phase-modulating SLM.

Since black levels of the illumination speckle pattern cannot be compensated by the grey level of the second SLM some kind of de-speckle needs to be implemented as in any conventional available projection system using laser illumination. In practical cases for example a diffuser device as a very weak diffuser can be added to the projection device or the sufficiently coherent light source as a laser can be modified. For instance, also a small angular spectrum of sufficiently coherent illumination of the first, phase-modulating SLM can be used to generate some smoothing of the illumination of the second SLM. In this case an additional diffuser device may be omitted in the projection device. Spectral width of the light beam emitted by the illumination device has an effect similar to a diffuser device. Therefore, the use of a suitable spectral width can be provided instead of a diffuser device to affect positively the speckle pattern.

For the simulation of speckle the following is assumed: A very weak diffuser or a similar device or tool causes a smoothing of the illumination over an array of 8×8 pixels of the second SLM. In this way, there is an averaging procedure (mathematically acting as a sliding average) that largely reduces the local brightness variation by the speckle pattern. The result of such an averaging is shown in FIGS. 7 and 8.

Figure 7:
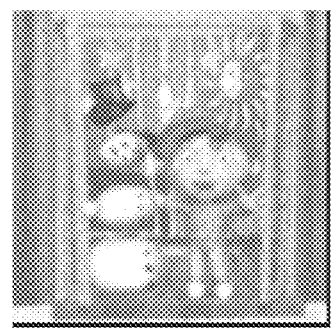
FIG. 7 shows the result by using of a diffusor device for speckle reduction for the same resolution of both spatial light modulator devices.

In FIG. 7 the result is shown by using a diffuser device in the projection device where the first, phase-modulating SLM and the second SLM have the same resolution.

Figure 8:
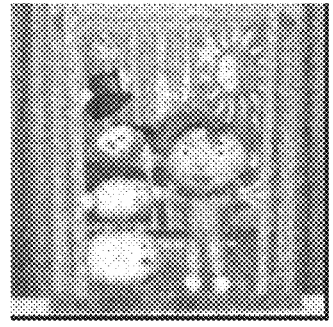
FIG. 8 shows the result of the same diffusor device according to FIG. 7 if the phase-modulating spatial light modulator device has a resolution of one quarter in horizontal direction as well as in vertical direction compared to the resolution of the second spatial light modulator, FIG. 9a, b, c show the image of FIG. 4c, where it is shown how a target output of the image according to FIG. 4a is achieved by a combination of an illumination image according to FIG. 4b and a modified image on the second spatial light modulator according to FIG. 4c.

In FIG. 8 the result is shown by using the same diffuser device in the projection device as in FIG. 7 where however the first, phase-modulating SLM has only a resolution of one quarter in the horizontal direction as well as in the vertical direction compared to the resolution of the second SLM.

It can be seen in FIGS. 7 and 8 that in both simulation cases the effect of the speckle pattern is significantly reduced. In the second case shown in FIG. 8 due to larger speckle size related to the lower resolution of the first SLM the remaining brightness variations are also larger. But this is only an example that just shows that the properties of the diffuser device or any other speckle reduction device or tool have to be adapted to the resolution of the first, phase-modulating SLM.

Otherwise, smoothing over a larger area of the second SLM will also reduce the possibility to generate a very small but very bright spot. Therefore, a suitable combination of classical de-speckle solutions, as e.g. using a diffusor, and solutions according to the Applicant, as e.g. using several time sequential holograms each of them generating only part of the intensity distribution on the second SLM, has to be used.

The following description refers to the matching of the illumination distribution with the content or image to be displayed on the second SLM.

The amplitude values of the pixels of the second SLM have to be recalculated in order to generate the correct output image in combination with the illumination on the second SLM.

In order to keep the correct grey level distribution in the content or in the image to be displayed on the second SLM the brightness of each pixel of the second SLM has to be increased by the same factor. For example, the content or image might include two bright spots of equal intensity. For some reason, for example not fully corrected speckle pattern, by the holographic illumination of the second SLM the illumination intensity for spot 1 might be increased by a factor of 10 but for the other spot 2 only by a factor of 8. Then, in order to keep equal output intensity of both spots 1 and 2 only the factor of 8 can be used for actual brightness increase. This means to set the transmittance on the second SLM to maximum 100% for the pixels of spot 2 but only to 80% for the pixels of spot 1.

As result, the final output content or image will be presented with the desired features as higher overall brightness, brighter highlights, less total energy consumption of light source etc.

Basically, for all pixels of the second SLM the following equation applies: $B_i \times C_i = G \times T_i$, where $B_i$ is the backlight illumination intensity of the pixel i, $T_i$ is the target intensity of the pixel i, $C_i$ is the correction intensity of the pixel i to be shown on the second SLM and G is the brightness increase by the holographic illumination of the second SLM.

As already explained, in principle, the correction intensity $C_i$ is required to compensate for different kind of blur or smoothing of the illumination intensity coming from the hologram on the first SLM by different resolutions of both SLM, of the first SLM and the second SLM, or as a result of other corrections, like for example misalignment of the position of the second SLM in the projection device and its impact on the illumination of this SLM. The compensation by means of using the correction intensity $C_i$ will be done for any residual brightness variations of the illumination of the second SLM.

Figure 4C:
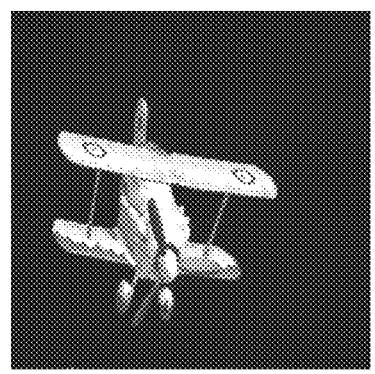
Figure 9A:
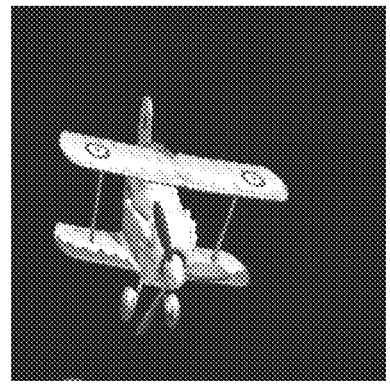
Figure 9B:
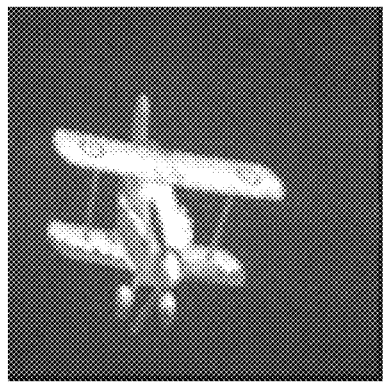
Figure 9C:
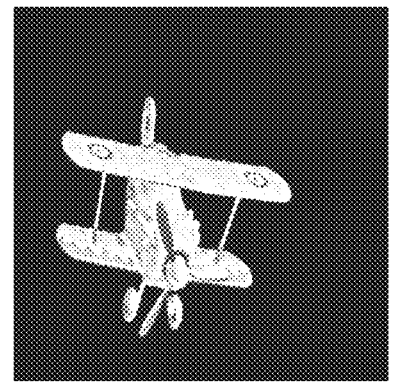

For the example of the image "Airplane" according to FIG. 4c, it can be shown how the target output image is achieved by a combination of an image or hologram displayed on the first, phase-modulating SLM (FIG. 9b) and a modified image on the second SLM (FIG. 9c). This is shown in the FIG. 9a where the target output image is shown, in FIG. 9b where the image of the first SLM is shown and in FIG. 9c where the amplitude modulation on the second SLM is shown that is used for correction. Here, it must be pointed out that the images shown in the FIGS. 9a to 9c show only a relative brightness and are not a direct measure for the improvement of the brightness. The actual brightness improvement for the image or scene with the "Airplane" was calculated accordingly. In this example according to FIG. 9a the brightness increases by a factor of 4× to 5×. Naturally, the brightness increase is dependent on the image or content to be displayed and of the properties of the first SLM and the second SLM.

With the increase of the brightness in selected regions or in an image scene on the second SLM it is also possible to show more grey shades in an image scene, i.e. an increased bit depth. In this case for example the predefined target illumination intensity generated by the first SLM might still have 8 bit grey levels but the bit depth may be increased by fine-tuning the amplitude modulation on the second SLM, for example to 10 or 12 bit.

A projection device according to a second embodiment of the invention can be further provided. The projection device is then designed in a form of a hybrid system.

This projection device comprises the projection device according to the first embodiment according to FIG. 3 and additionally a further spatial light modulator device which is designated here as a third SLM. This third SLM is designed as a conventional SLM, e.g. a DLP or a DMD, and is arranged in a parallel manner to the first, phase-modulating SLM 3. The third SLM is used for an illumination of the second SLM 4 as in a conventional projection system. This means, depending on the actual content to be displayed on the second SLM 4 a switching can be done between both the projection device according to FIG. 3 and the conventional projection system which is formed by the third SLM and the second SLM 4. It is chosen according to the content to be displayed before which projection type or projection way is the one that is more efficient for this certain type of content. Then, the more efficient projection way is used.

The choice of the more efficient projection way means for example that for scenes to be displayed with large areas/regions of the same brightness on the second SLM 4 the third SLM is used for the illumination of the second SLM 4. For scenes to be displayed with small very bright objects the first, phase-modulating SLM 3 is used for a holographic illumination of the second SLM 4.

Figure 10:
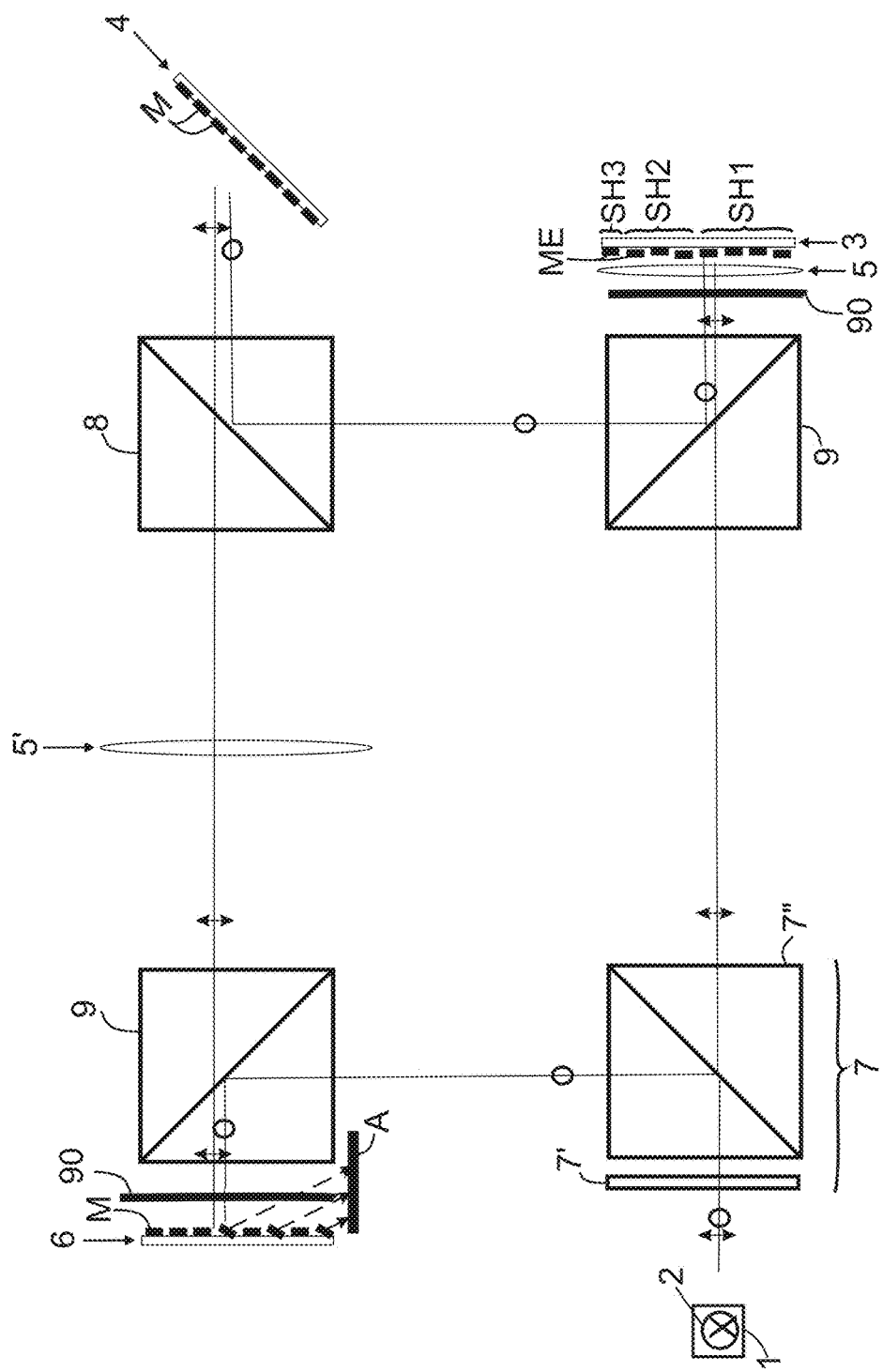
FIG. 10 shows a simplified schematic illustration of a projection device designed as a hybrid system according to the invention in a side view, and FIG. 11a, b, c show the image of FIG. 4b, where

An advanced version of such a projection device is shown in FIG. 10 and has a variable switch device 7 from the light source 2 to both type of illumination SLM, the first SLM 3 and the further spatial light modulator device designated here as third SLM 6. The variable switch device 7 can for example comprise a variable beam splitter element or a similar element.

The switching between these both projection ways and types can be provided by the use of the variable switch device 7 arranging between the illumination device 1 and the first, phase-modulating SLM 3 and the third SLM 6 respectively. In the FIG. 10 as one embodiment of a variable switch device 7 a combination of a variable polarization rotating element 7', like for example a rotatable half wave plate or an LC switch, and a polarizing beam splitter element 7" is shown. By changing the polarization of the light input the splitting ratio of the beam splitter element 7" is changed as shown by the both polarization states. Transverse electric polarized light is shown by the circle and transverse magnetic polarized light is shown by the double arrow.

Thus, a part of the light emitted by the light source 2 of the illumination device 1 can be directed to the first SLM 3 without specific effect of the variable switch device 7 for a holographic illumination of the second SLM 4. The remaining part of the light emitted by the light source 2 and not directed to the first SLM 3 can be directed e.g. by means of deflection to the third SLM 6 by using the variable switch device 7 for a conventional illumination of the second SLM 4. The imaging element 5 of the optical system is located between the first SLM 3 and the second SLM 4 and another imaging element 5' of the optical system is arranged between the third SLM 6 and the second SLM 4.

A beam combining element 8 arranging between the first SLM 3 and the third SLM 6 respectively and the second SLM 4 as can be seen in FIG. 10 can be used for deflecting the light modulated by the first SLM 3 and in particular for combining this part of light with the remaining part of light modulated by the third SLM 6. The combined light is directed then in direction of the second SLM 4.

In FIG. 10 the optical system used here in the second embodiment of the invention comprises additional polarizing beam splitters 9 and quarter wave plates 90. Polarized light coming from the polarized beam splitter element 7" and passing the quarter wave plate 90 and the first SLM 3 is rotated by 90° deg and leaves the polarizing beam splitter element 9 in a direction different from the input direction.

Of course, modifications of the arranging of the elements or devices of the projection device according to FIG. 10 are possible, as e.g. the arrangement of the SLM 3, 4 and 6 to each other.

As example, the variable switch device 7 is provided for sending for instance 80% of the input light emitted by the light source 2 to the third SLM 6 for a conventional illumination and 20% to the first SLM 3 for a holographic illumination of the second SLM 4, depending on the content to be displayed. This 20% of the holographic illumination might then be concentrated to a few small bright spots on the second SLM 4 in order to increase the intensity of such spots.

Such a projection device according to the second embodiment of the invention and especially according to FIG. 10 can be especially used in such cases where a holographic illumination of the second SLM 4 might lead to a decrease of brightness compared to a conventional system.

The grey level distribution in the content to be displayed on the second SLM depends on the result how the ratio of input light for the conventional illumination and for the holographic illumination of the second SLM 4 is calculated.

As a target in a projection device designed as hybrid system comprising both illumination versions conventional illumination and holographic illumination of the second SLM 4 to create the most efficient way to get an improvement in brightness in a scene is therefore to divide the content to be displayed into two parts. A first part of the content to be displayed includes pixels having medium values of grey shades as can be seen in FIG. 11*b*. A second part of the content to be displayed only includes pixel having values with high brightness as can be seen in FIG. 11*c*.

Figure 11A:
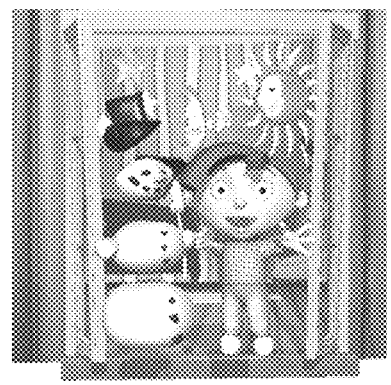
FIG. 11a shows the original image and the FIGS. 11b and 11c show images generated by the hybrid system.
Figure 11B:
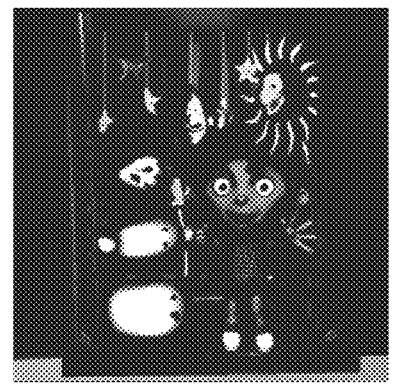
Figure 11C:
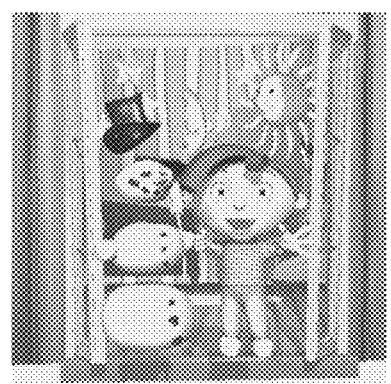

In the embodiment with the "Snow window" as example according to FIG. 4*b* the division of the content of this scene shown in FIG. 11*a* could be for example as shown in the FIGS. 11*b* and 11*c*.

In this example the content shown in FIG. 11*b* can be generated by the conventional illumination way using the third SLM 6 and comprising a lower light intensity required than for the original image or content shown in FIG. 11*a* in order to generate the same output intensity. This means that bright parts of the content or image are removed. In FIG. 11*c*, the bright parts of the content or image can be generated by the holographic illumination way using the first, phase-modulating SLM 3. For these bright parts or spots all the light coming from the hologram encoded on the first, phase-modulating SLM 3 is focused to only small areas or regions in the image or content. Therefore, a large increase of brightness in these areas or regions is possible.

In this way, both illumination ways, the conventional illumination way and the holographic illumination way, can be combined to constitute a hybrid system in order to generate a projection device having an optimized illumination for increased peak brightness or in other words for having higher brightness in selected regions of an content (image) scene, much higher than the maximum brightness of the light source 2 of the illumination device 1.

Finally, it must be said that the embodiments described above regarding the projection device only with a holographic illumination of the second SLM and the projection device designed as hybrid system shall solely be understood to illustrate the claimed teaching, but that the claimed teaching is not limited to these embodiments. Combinations of embodiments are possible.

What is claimed is:

1. A projection device for displaying at least one of a two-dimensional and three-dimensional scene or of content comprising:

An illumination device comprising at least one light source for generating coherent light, At least two spatial light modulator devices, where one of said spatial light modulator devices is designed as spatial light modulator device modulating at least the phase of the light for the holographical generation of illumination patterns by use of hologram data written into said spatial light modulator, said spatial light modulator device as first spatial light modulator device is followed by a second spatial light modulator device, the first spatial light modulator device provides a phase modulation range of larger than or equal to 2π for the primary colors red, green and blue of the illumination device, An optical system disposed to illuminate the second spatial light modulator device with a predefinable light distribution generated by the first spatial light modulator device, and the resolution or the pixel pitch of the first spatial light modulator device and the distance between the first spatial light modulator device and the second spatial light modulator device are determined such that for all wavelengths of the illumination the dimension of one diffraction order of the first spatial light modulator device which is generated on the second spatial light modulator device does not fall below a value of the area of the second spatial light modulator device.

2. The projection device according to claim 1, wherein the optical system comprising at least one imaging element.

3. The projection device according to claim 1, wherein the optical system is provided close to or directly at the position of the first spatial light modulator device.

4. The projection device according to claim 1, wherein the second spatial light modulator device is provided in or close to the Fourier plane of the first spatial light modulator device generated by the optical system.

5. The projection device according to claim 1, wherein the at least one light source of the illumination device comprises a sufficiently large coherence for reconstruction of the hologram encoded on the first spatial light modulator device.

6. The projection device according to claim 1, wherein the at least one light source of the illumination device comprises a sufficiently small coherence for reduction of speckle.

7. The projection device according to claim 1, wherein a diffuser device is provided for reduction of speckle in the light distribution of the illumination on the second spatial light modulator device.

8. The projection device according to claim 1, wherein a correction intensity factor is provided for compensating for blur or for smoothing of the illumination intensity from the hologram.

9. The projection device according to claim 1, further comprising a further spatial light modulator device, said further spatial light modulator device is arranged in parallel to the first spatial light modulator device for illumination the second spatial light modulator device.

10. The projection device according to claim 9, wherein the same at least one light source is used for the holographical generation of illumination patterns with the first spatial light modulator device and for illumination with the further spatial light modulator device.

11. The projection device according to claim 9, wherein the illumination device comprises at least two light sources, where at least one of the at least two light sources is used for the holographical generation of illumination patterns with the first spatial light modulator device whereas at least one other light source of the at least two light sources is used for illumination with the further spatial light modulator device.

12. The projection device according to claim 11, wherein at least one of the at least two light sources comprises a sufficiently large coherence for reconstruction of the hologram encoded on the first spatial light modulator device whereas at least one other of the at least two light sources is an incoherent light source for incoherent illumination with the further spatial light modulator.

13. The projection device according to claim 9, wherein a switch device is provided for switching from the first spatial light modulator device to the further spatial light modulator device and vice versa for the selection of the more efficient way of illumination of the second spatial light modulator device, depending on the actual content to be displayed on the second spatial light modulator device.

14. The projection system according to claim 9, wherein a switch device is provided, the switch device is designed as a variable switch device for switching from the illumination device to both the first spatial light modulator device and the further spatial light modulator device for directing a predefined quantity of light emitted by the illumination device to the first spatial light modulator device and a predefined quantity of light to the further spatial light modulator device, depending on the actual content to be displayed on the second spatial light modulator device.

15. The projection device according to claim 9, wherein the further spatial light modulator device is designed as DPL (digital light processing) type spatial light modulator device or as DMD (digital micro mirror device) type spatial light modulator device.

16. The projection device according to claim 1, wherein the first spatial light modulator device is designed as MEMS (micro electro mechanical system) type spatial light modulator device comprising tip mirror elements for modulating the phase of the light in an analogue manner.

17. The projection device according to claim 1, wherein the second spatial light modulator device is designed as DPL (digital light processing) type spatial light modulator device or as DMD (digital micro mirror device) type spatial light modulator device.

18. A method for displaying at least one of a two-dimensional and three-dimensional scene or of content, the method comprising:

generating coherent light by an illumination device comprising at least one light source, predefining a light distribution depending on the brightness distribution of a scene or of content to be displayed, holographically generating said predefinable light distribution by calculating a hologram and encoding said hologram into a first spatial light modulator device designed as spatial light modulator device modulating at least the phase of the light and arranging a second spatial light modulator device which follows the first spatial light modulator device, seen in the propagation of light, illuminating the second spatial light modulator device with said predefinable light distribution according to the hologram generated by the first spatial light modulator device by an optical system, and modulating a light field having the predefinable light distribution incident on the second spatial light modulator device by said second spatial light modulator device in such a way as displaying the reconstruction of that scene.

19. The method according to claim 18, wherein the optical system is disposed in such a way that the Fourier plane is generated at or close to the second spatial light modulator device.

20. The method according to claim 18, wherein the predefinable light distribution for illumination of the second spatial light modulator device is adapted within the area of the second spatial light modulator device, depending on the content to be displayed on the second spatial light modulator device.

21. The method according to claim 20, wherein the illumination light of dark areas in a scene on the second spatial light modulator device is reduced to redirect this illumination light to bright areas in said scene.

22. The method according to claim 20, wherein sub-holograms of the hologram are generated on the first spatial light modulator device to generate a predefined light distribution on the second spatial light modulator device.

23. The method according to claim 22, wherein the sub-holograms focus light from the first spatial light modulator device to regions on the second spatial light modulator de-vice or the sub-holograms have each a focus in a plane different from the plane of the second spatial light modulator device to illuminate simultaneously several pixels of the second spatial light modulator device.

* * * * *